Patented Mar. 7, 1944

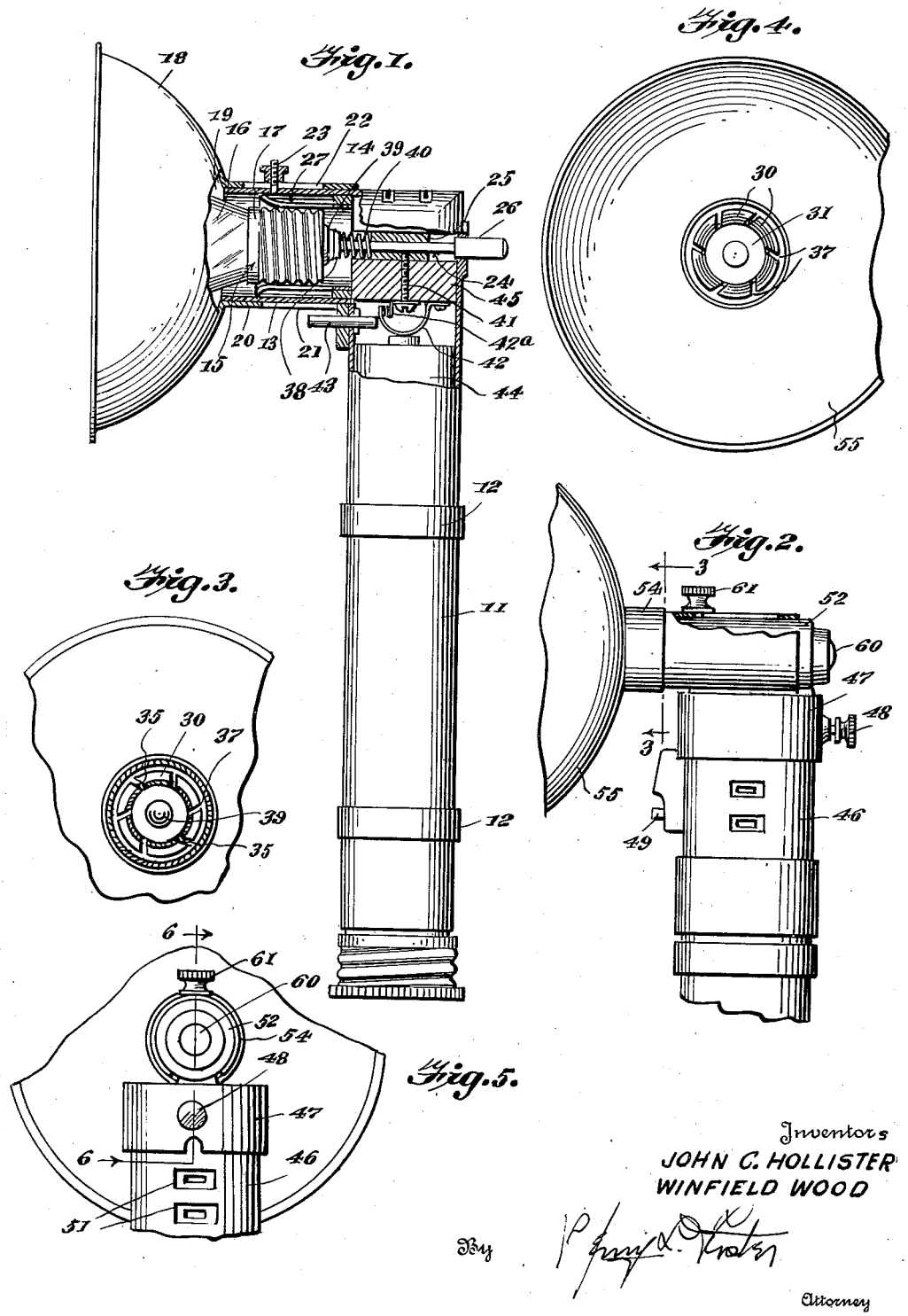

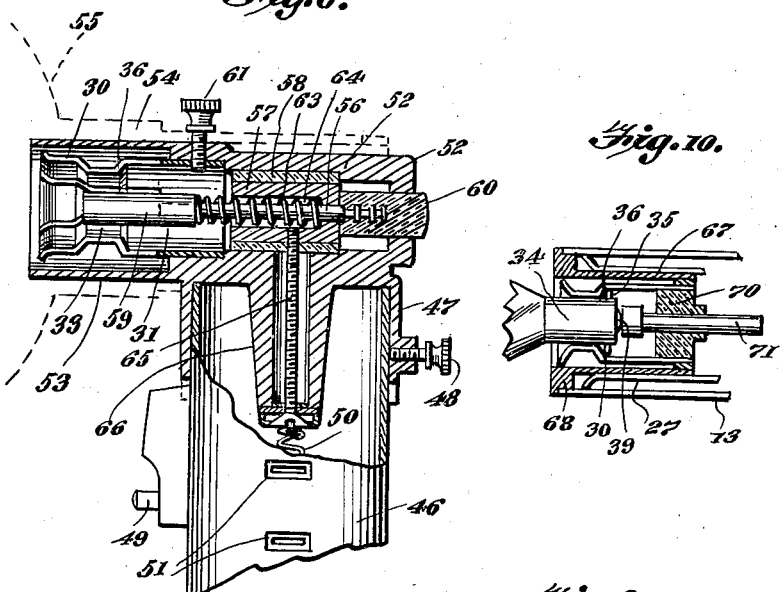
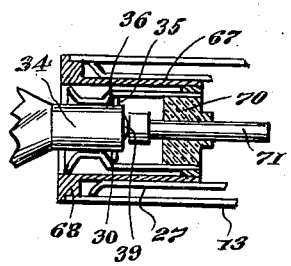
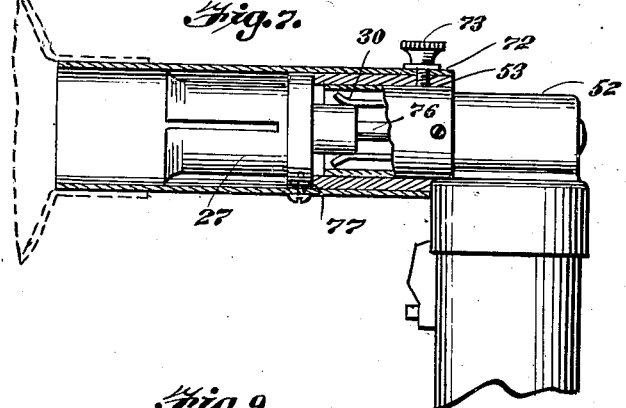
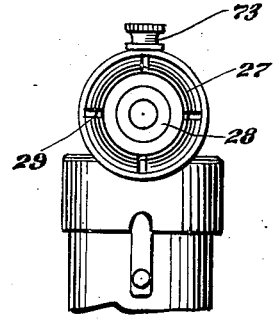
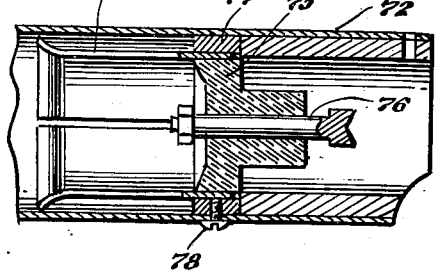

2,343,552

UNITED STATES PATENT OFFICE 2,343,552

PHOTOFLASH DEVICE

John C. Hollister and Winfield Wood, Denver, Colo.

Application September 22, 1941, Serial No. 411,930

3 Claims. (Cl. 67—31)

This invention relates to photo-flash lamp-holding assemblies of the type known as "photo-flash lamp synchronizers," which are attached to cameras for the purpose of taking photo-flash pictures. As is well known, these devices comprise battery cases with which are organized electrical sockets for the reception of photo-flash bulbs, switches for closing circuits from batteries within the casings to the sockets to fire the bulbs, and reflectors for directing the light from the bulbs to the subjects to be photographed. Synchronizers for tripping the shutters of the cameras with which the assemblies are used are also included in such devices.

The primary object of our invention is to provide an organization of a photo-flash lamp-holding assembly wherein is provided novel means for adjustably focusing the light from the lamp upon the subject to be photographed.

Another object is to provide in such an assembly an arrangement that permits utilization of a novel ejector for removing burned lamps from the socket, and additionally to provide a novel ejector for accomplishing such removal of burned lamps.

Still another object is the provision of a novel type of photo-flash lamp-receiving socket that permits insertion and removal of lamps by straight-line movement of the lamps in directions of the axis of the socket.

A photo-flash lamp synchronizing assembly constructed in accordance with general prior practice comprises a battery case arranged for mounting upon a camera in vertical disposition with a socket at its upper end arranged to receive a lamp and hold it with its longitudinal axis in vertical disposition. The reflector in such an assembly is mounted on the battery case with its concave surface faced toward the front of the camera, in the direction of the subject, such reflector having an opening through one side for reception of the socket structure, such structure being arranged to support a lamp with its bulb approximately at the focus of the reflector. The arrangement of the lamp-supporting structure in a side opening of a reflector is one that does not lend itself to ideal focusing, by reason of the difficulty involved in changing the position of the lamps relative to the reflector. There is also a disadvantage in such an organization arising from the necessary positioning of the neck of the lamp bulb, and often a part of the socket structure also, in the path of a portion of the light directed toward the subject by the reflector. In some cases this interference is sufficient to throw a shadow pattern upon the subject, in other cases it results in a slight diminution of the intensity of the flash. The standard arrangement also results in a variation in the positions of bulbs of different sized lamps relative to the axis of the reflector.

There have been suggestions to place the socket structure in right angular relation to the battery casing so that the end of a photo-flash lamp mounted in the socket will be directed toward the subject. The present invention constitutes an improvement of this type of device.

In the accompanying drawings:

Figure 1 is a broken elevation of a photo-flash lamp-holding assembly constructed according to this invention.

Figure 2 is an elevation of a modification in the form of an adapter by means of which the invention may be used with the battery case of a standard type assembly.

Figure 3 is a sectional view on line 3—3 of Figure 2.

Figure 4 is a front elevation of the adapter of Figure 2.

Figure 5 is a rear elevation thereof.

Figure 6 is a sectional view on line 6—6 of Figure 5.

Figure 7 is a vertical sectional view showing the construction of an adapter by means of which screw-base lamps may be used in an assembly provided with a socket designed to receive bulbs provided with bayonet bases.

Figure 8 is a front elevation thereof.

Figure 9 is a horizontal sectional view of such adapter.

Figure 10 is a vertical sectional view of an adapter by means of which bayonet-base lamps may be used in an assembly provided with a socket designed to receive bulbs of the screw-base type.

Describing the drawings in detail and referring to Figure 1, the numeral 11 indicates a battery casing of the kind heretofore used for flash photography, being provided with mounting devices, as the bands 12, for securing to a camera with the axis of the casing in vertical disposition. Instead of a socket mounted in the casing a tubular member 13 is supported by the upper end of the casing and arranged at right angles to the axis of the casing so that when the assembly is mounted on a camera the axis of the tubular member 13 is parallel to the axis of the lens of such camera. The tubular member 13 also projects forward from the battery casing, providing a cylindrical extension in the direction of the field of the camera.

The tubular member 13 serves as a support for an electrical socket assembly, designated generally 14, which will be later described in detail, and which is arranged to hold a photo-flash lamp with its bulb 16 directed toward the subject and its base structure 17 to the rear of the bulb. The tubular member 13 also serves as a support for a reflector 18 which has a central opening through which the axis of the reflector is extended, the arrangement being such that the reflector is symmetrical about its axis and about the opening 19. Surrounding the opening 19 and extended rearwardly therefrom is a sleeve 20 secured to the reflector and of such diameter as to engage snugly upon the outer surface of the tubular member 13. The sleeve 20 serves to support the reflector and is slidable along the supporting tubular member 13 for the purpose of adjusting the relative positions of the bulb of a photo-flash lamp mounted in the socket assembly 14 and the reflector, whereby the light reflected upon a subject may be focused upon such subject. To provide a firm support for the reflector and accurately position it relative to the socket the sleeve 20 is made of substantial length and its lower reach is provided with a slot 21 for clearing the battery casing 11 when the reflector is moved to a rearward position. A narrow slot 22 is provided in the top reach of the sleeve 20 for reception of a locking screw by means of which the position of the reflector may be fixed.

One difficulty that has been encountered in photo-flash photography, particularly in professional news work, is that of taking a number of pictures in rapid succession. The bulbs of photo-flash lamps become heated to a sufficient extent to inflict burns when grasped immediately after firing. The bulb structure is often weakened by the combustion of the material within them so that sometimes the bulb structure is pulled away from the base or disintegrates when the bulb is grasped and subjected to the stress of removing the lamp from the socket. Advantage is taken of the axial arrangement of the tubular member 13 to overcome these difficulties by providing an ejector arranged to engage the base of the lamps from the rear and to be operable to exert an ejecting pressure upon their base structures. The ejector comprises a plunger 24 slidably mounted in a supporting block 25 mounted in the rear portion of the tubular member 13, which plunger is movable between a rearward, inactive position, shown in Figure 1, and a forward, ejecting position, illustrated in Figure 6. The plunger 24 is extended through the rear wall of the tubular member 13 and is there provided with a push button 26.

In view of the provision of the ejector which is arranged to exert a straight-line thrust upon the lamps mounted in the socket, the socket structure 14 is of a resilient grip type. Two forms of socket are shown in the drawings, one being designed to receive and hold lamps of the relatively large type having bases provided with external screw threads. This type of socket is shown in Figures 1, 7, 8 and 9, and comprises plural spring leaves or fingers 27 that enclose a lamp base-receiving pocket 28. The leaves 27 are separated by slots 29 that give the assembly resilience and permit the leaves to spread when a lamp base is thrust into the pocket 28. The other type of socket structure is designed for holding relatively small lamps having bases provided with projecting bayonet pins for cooperation with bayonet slots in sockets designed to receive them. Such a socket assembly is illustrated in Figures 3, 4, 6 and 10, and comprises a plurality, here shown as six, resilient leaves or fingers 30 which enclose a base-receiving pocket 31. It will be noted from Figures 6 and 10 that the leaves 30, which project from a supporting base 31, are longitudinally formed to provide a rear chamber 32 and a restricted throat 33 in advance of the chamber. The throat 33 is straight walled and provides an axially disposed relatively extensive cylindrical bearing for receiving and supporting the cylindrical base of a lamp, shown at 34 in Figure 10, to hold the lamp securely and with its bulb properly positioned relative to the axis of the assembly. In this socket structure the bayonet pin 35 engages behind the shoulder 36 with which the fingers 30 are provided at the juncture of the chamber 32 and throat 33.

The fingers 30, as shown in Figures 3 and 4, are separated by slots 37. These slots are specially arranged to avoid jamming or sticking of bayonet pins of lamp bases in travelling into and out of the pocket 31. To this end the slots 37 are arranged relative to radii of the pocket 31 at angles sufficiently acute to afford within the slots bearing surfaces upon which bayonet pins may ride (see 35 in Figure 3).

Returning to the arrangement of the ejector, the plunger 24 and bearing block 25 are made of electric conductive material. The plunger 24 is provided at its forward end with a contact element 38 properly positioned to engage the central terminal 39 of a lamp mounted in the socket and which provides a bearing surface for a coil spring 40 that surrounds the plunger and at its rear end thrusts against the forward surface of the bearing block 25. The block 25 provides a wiping contact with the plunger 24 and is by a screw 41 electrically connected through spring leaves 42 and 42a, which are operated by a push button 43, with batteries 44 enclosed in the casing 11. The spring leaf 42 is carried by an insulating block 45 mounted within the assembly and through which the screw 41 is threaded into contact with the block 25. In accordance with common practice the spring fingers of the socket are grounded to the tubular member 13 and the circuit is completed through the battery casing 11.

Turning to the assembly shown in Figure 6, the numeral 46 indicates a standard type of casing with which a socket in axial arrangement with the casing is normally used, the structure illustrated in this figure being an adapter by means of which the advantages of the arrangement described above may be achieved with this type of casing. The structure comprises a depending tubular flange 47 that is engaged upon the outer surface of the casing 46 to which it is secured by a screw 48. As usual in assemblies employing a casing of this type there is a built-in switch controlled by a button 49 for controlling the circuit through a spring contact 50 that is normally provided in such casings for engagement with the terminal of a socket structure. Plug-receiving sockets 51 are connected in parallel with the lamp socket circuit for connection of an electrically operated shutter tripping device, the synchronizer being arranged to trip the shutter at the instant of maximum intensity of a photo-flash lamp held in the socket and fired by operation of the switch button.

The structure of the adapter illustrated in Figures 2 and 6 is generally similar to the structure illustrated in Figure 1, comprising a tubular member 52 that is arranged at right angles to the axis of the flange 47, and that projects forwardly beyond such flange to provide an extended cylindrical bearing portion 53 for engagement by the sleeve 54 of a reflector 55, and to permit sliding of such reflector for focusing adjustment relative to the bulb of a lamp mounted in the socket. A conductive plunger 56 is movable along the longitudinal axis of the member 52, being supported in a conductive block 57 that is mounted in an insulating sleeve 58 engaged within the tubular member 52, and the plunger 56 carries a conducting terminal element 59 for engagement with the central terminal of a lamp held in the socket. The rear end of the plunger carries a button 60 that projects through the wall of the structure for operation as a push button. A locking screw 61 is threaded into the member 52 and penetrates a slot 62 in the sleeve of the reflector.

The plunger is urged forwardly by a spring 63 coiled about it and bearing against the rear surface of the terminal member 59 and the end surface of a bore 64 in the block 57 within which bore the spring is arranged. A screw 65 is threaded into the block 57 and serves as a terminal and conductor for engagement with the spring contact 50, the screw being surrounded by a supporting nipple 66 that depends from the structure of the tubular member 52.

As indicated above, there are two general types of flash lamps that may be used in photo-flash photography, one being small and provided with a cylindrical base from which project bayonet slot-engaging pins, the other type being relatively large and provided with a screw threaded base. It is desirable that a flash lamp holding assembly be usable with either type of bulb. To this end the adapter illustrated in Figure 10 may be used with an assembly such as that shown in Figure 1 which is provided with a socket designed for use with the screw type lamps. The adapter comprises a tubular body 67 within which is mounted a socket structure of the type disclosed in Figure 6, to the elements of which the same numerals as those of Figure 6 have been applied. The body member 67 at its forward end carries a flange structure 68 engageable upon the inner surface of the tubular member 13 of Figure 1 where it is held by the resilient leaves 27. At its rear end the body member 67 is closed by a block 70 of insulating material through which is slidably extended an auxiliary ejector plunger 71 made of conductive material and which serves as a continuation of the plunger 24 of Figure 1. When this adapter is mounted on the tubular element 13, the reflector is movable along the member 13 for focusing, and body member 67 engages the inner surfaces of the spring fingers 27 of the socket, which engagement assures a firm support and correct positioning of the auxiliary socket and which also insures grounding of the spring fingers 30.

In case the main assembly is provided with a socket of the type shown in Figure 6, intended for use with lamps having bases of bayonet type, the adapter shown in Figures 7 to 9 may be employed to permit use of lamps of the screw base type. This adapter comprises a tubular body 72 that is engageable upon the outer surface of the tubular bearing member 53 and that is secured thereto by means of a locking screw 73 engageable in the place of the locking screw 61 of Figure 6. The tubular member 72 carries a socket assembly comprising spring fingers of the same type as those of Figure 1, similarly designated 27, that secure a screw threaded lamp base. An auxiliary ejecting plunger 76 penetrates the central part of an insulating block 75. The finger structure 27 is grounded to the tubular member 72 by means of a collar 77. The member 75 in addition to supporting the plunger member 76 also serves to engage the spring fingers 30 of the primary socket to thereby steady the ejector extension 76 and assure it of firm support and correct position. Contact is made with the center terminal of the flash lamp through the ejector extension 76 when in contact with ejector rod 59 in Figure 6.

From the foregoing it will be seen that the primary aspect of the arrangement by means of which focusing is accomplished lies in the disposition of an externally elongated member with its axis substantially parallel to the axis of the lens of a camera upon which the assembly is mounted and projecting a substantial distance forwardly of the supporting structure, which is here shown as the battery casing, and which provides for slidably mounting of a reflector so that a socket mounted within the longitudinally extended member and a reflector slidably engaged upon the outside of the member may be relatively moved in directions that extend axially of the socket and reflector, for focusing light emitted by a bulb held by the socket. The axial disposition of a socket relative to the axis of a camera lens insures that lamp bulbs of different sizes will all be properly centered with respect to a reflector symmetrically surrounding the projecting member. Certain advantages arise from this arrangement. It permits the use of symmetrical reflectors with central openings which are capable of easier manufacture and design than reflectors of the standard type having openings arranged for lateral support of lamps. The axial arrangement of the socket also permits the use of an entirely practical and very simple type of ejector, and the angular positioning of the tubular member relative to the supporting structure permits the ejector to be in the form of a plunger member that extends completely through the tubular member to a push button projecting from the rear surface of the member where its projection cannot interfere with adjustment of the reflector. The arrangement also permits the ejector rod to serve the purpose of a center contact for the flash lamp. It also permits focusing to be carried out correctly, by relatively moving the socket and reflector in directions parallel to the axes of the reflector and the lamp bulb, and insures that the reflector and bulb will be correctly centered. The axial arrangement of the socket permits the support of lamps with their bulbs directed forwardly and with their base structures entirely outside of the path of light directed towards the subject by the reflector. Finally the arrangement permits the use of adapters that hold the lamps in correct position, and permits the provision in such adapters of auxiliary ejectors operable by the normal operation of the primary ejectors.

We claim:

1. In a flash lamp-holding assembly including a supporting member arranged for mounting on a camera; and electrical socket assembly mounted on the supporting member, the said socket comprising plural resilient leaves surrounding a lamp base-receiving pocket and arranged to be pressed outwardly by an inserted lamp base, the said leaves being of axial configuration to form a constricted base-engaging throat terminating rearwardly in a bayonet pin-engaging shoulder, the said leaves being separated by slots arranged at such acute angles to radii of the pocket as to provide bearing surfaces within the slots for sliding engagement by lamp base-carried bayonet pins.

2. A flash lamp supporting assembly comprising a tubular supporting member, an electrical socket assembly mounted on the tubular member in axially parallel relation thereto, the said socket having resilient lamp base-engaging means arranged to receive and hold a lamp base thrust axially into it, a conductive ejector element arranged for engagement with the central terminal of a lamp held in the said socket assembly and mounted in the tube for movement parallel to its axis, an operating member projecting from the tube for manual actuation of the ejector element, an electrical terminal member mounted in the tubular member and arranged for connection with a current source, and a contact member connected with the said terminal member and arranged to make wiping contact with the said ejector element.

3. A flash lamp-supporting assembly according to claim 2, wherein the said operating member is extended longitudinally from the socket assembly and projects from the opposite end of the tube for manual operation, and wherein the terminal member is extended laterally from the tubular member.

JOHN C. HOLLISTER.
WINFIELD WOOD.